(No Model.)
J. P. TURNER.
CULTIVATOR.
No. 429,824. Patented June 10, 1890.
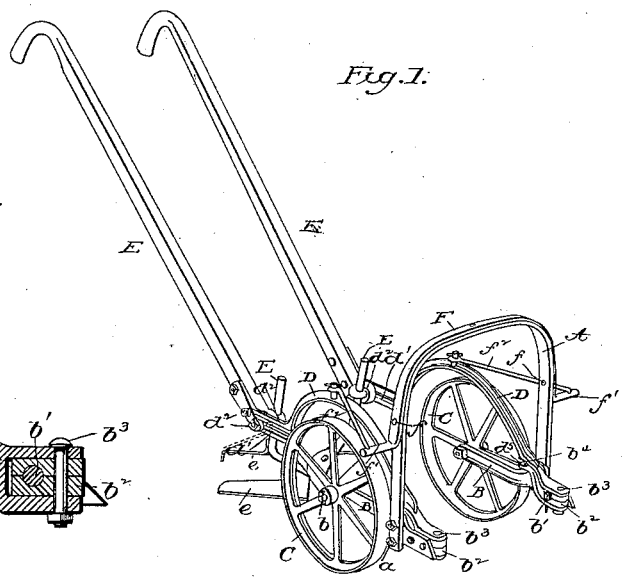
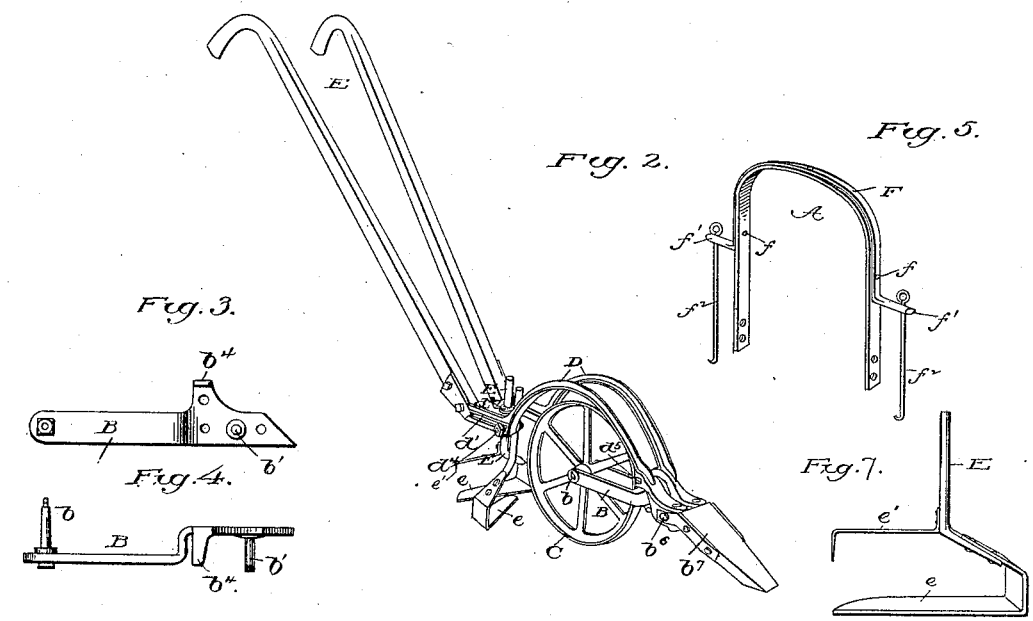
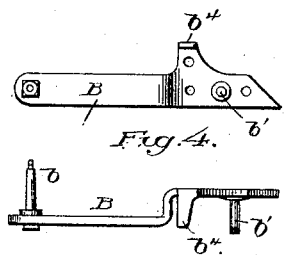
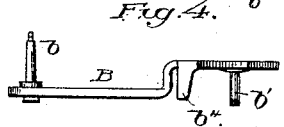
Witnesses:
W. W. Mortimer
W. R. Kennedy
Inventor:
J. P. Turner
By Phil T. Dodge
atty

UNITED STATES PATENT OFFICE.

JAMES P. TURNER, OF DAVENPORT, IOWA.

CULTIVATOR.

SPECIFICATION forming part of Letters Patent No. 429,824, dated June 10, 1890.

Application filed January 16, 1890. Serial No. 337,064. (No model.)

*To all whom it may concern:*

Be it known that I, JAMES P. TURNER, of Davenport, in the county of Scott and State of Iowa, have invented certain Improvements in Cultivators, of which the following is a specification.

This invention relates to that class of hand-cultivators commonly known as "wheeled hoes," used for the cultivation of vegetables, small fruits, plants, &c.

The objects of the invention are, primarily, to provide a machine which may be propelled and controlled by handles, and in which the two shares or knives may be moved vertically and laterally at will by means of the handles without causing the machine to veer or either wheel to precede the other, and, secondly, to adapt the machine for the use of two wheels and hoes or weeders, or for use as a single-wheeled hoe at will.

In the accompanying drawings, Figure 1 is a perspective view or my machine in its normal condition. Fig. 2 is a perspective view of the same as adjusted for a single wheel. Figs. 3, 4, 5, and 6 are views of various details. Fig. 7 is a perspective view of a shovel provided with an attachment for determining the location of its point.

Referring to Figs. 1 and 2, A represents a rigid bar of an arched or ⌒ form, the ends of which are secured rigidly by bolts $a$ to rigid fore-and-aft arms B. The arms B will extend horizontally and rearward of the arch, and at its rear end each arm is provided with an outwardly-projecting journal or axle $b$, carrying a ground-wheel C. The arch, its rigid arms, and the wheels at the rear ends of the arms, as described, serve as the rigid truck or main frame of the machine. Each of the arms B, near the forward end, is provided with a horizontal inwardly-projecting pivot $b'$, carrying a block or bearing $b^2$, which is in turn connected by a vertical pivot $b^3$ to the forward end of an arm or shank D. This connection permits each of the arms or shanks D to swing both vertically and lateral independently of its companion and of the frame. The independent vertical motion of the arms D is, however, limited by studs $b^4$, projecting from the arms B into recesses $d^5$ in the arms D, these recesses being of greater vertical width than the projections, in order to allow of vertical play between them. The forward ends of the arms B are bent outward, so that the vertical pivots of the arms D are directed forward of the respective wheels. The arms D are each curved upward and rearward over the corresponding wheel, and provided at the rear end with an uprising handle E, bolted rigidly thereto, the rear ends of the arms being suitably formed, as shown, to receive the handle. Each of the arms D is provided at the rear end just forward of its handle with a horizontal slot $d'$, to receive a transverse eyebolt $d^2$. Through each of these eyebolts I pass the upper end of a shank E, the lower end of which carries a knife blade or share $e$. The blade may be of any appropriate form; but I prefer to employ a blade of the form represented in the drawings, and more fully described hereinafter. The eyebolt is provided on its outer end with a nut $d^4$, by tightening which the shank E may be secured in any required position.

I apply to the eyebolt between the shank and the arm D two beveled washers, one of which is notched to fit the shank, while the other is free to rotate on the bolt when the latter is loosened. By this rotation of the washer the shank may be given any lateral inclination required in relation to the arm D.

Over the top of the arch A, I pass a correspondingly-curved bar F, attached thereto by horizontal pivots $f$, and turned outward at its ends, as shown at $f'$. To these outwardly-turned ends I joint rods $f^2$, which are in turn jointed at their rear ends to the respective arms D.

It will be seen that under the construction above described the main trunk or frame is supported by the ground-wheels, while the shovel or share carrying arms D are sustained by the frame and controlled by the handles. The connecting-rods $f^2$ maintain the frame or truck in an upright position, and the pivoted bar F serves as an equalizer to maintain the parts in operative relations.

The machines may be propelled by either or both handles without the slightest tendency to swerve from a direct course and without the possibility of either wheel advancing beyond the other. The vertical pivots $b^3$ permit the handles to be swung laterally to and from each other, so as to vary the distance between the shares or weeders. The horizontal pivots $b^4$ allow each share to be raised or lowered independently of the other.

When the machine is to be used as a single-wheeled hoe, I remove the arched frame A and the equalizer F, and also remove one of the wheels and its axle. I then bring the two arms B close together and introduce the wheel between them, passing the axle through the wheel and both arms, as shown in Fig. 2. I also connect the bearing-blocks $b^2$ by a bolt $b^6$ to the forked tongue, clevis, or other coupling $b^7$.

As shown in Fig. 7, the shovel consists of the vertical shank E, having at its lower end the laterally-extending blade $e$, adapted to act beneath the soil.

In order that the location of the point of the blade may be readily determined by the attendant, I provide the shank E with an arm $e'$, which extends laterally therefrom, its end terminating above and in a line vertically over the point of the shovel. By observing this arm the attendant will at all times be acquainted with the position of the shovel, and in this way can properly regulate its distance from the plants.

It is manifest that the indicating attachment may be secured to the shovel-carrying arms, as shown in dotted lines in Fig. 1, and arranged to be adjusted to bear a fixed relation to the point of the blade.

It is to be noted that my indicator overhangs the cutting-point, being sustained and carried wholly above the ground and independently of the cutting-point, so that it will not be clogged, broken, or concealed by weeds or rubbish accumulating thereon.

Having thus described my invention, what I claim is—

1. In a wheeled hoe, the arched frame, its rigid arms, and the wheels carried by said arms, in combination with the arms D, jointed to the wheel-frame to swing laterally and vertically, the handles attached rigidly to the respective arms D, the hoes or knives also attached to the respective arms, and the pivoted equalizing-bar F, connected by intermediate rods to arms D, as shown.

2. In a wheeled hoe, the arched frame, its rigid arms B, and the ground-wheels carried by said arms, in combination with the shovel-carrying arms D, provided with handles and jointed to the wheeled frame to swing vertically and laterally, and a stop device, as $b^4$, to limit the independent vertical play of the arms D.

3. In a wheeled hoe, the combination of a wheeled frame, two shovel-carrying arms jointed at their front ends to the frame and provided at their rear ends with handles by which to propel the machine, and an equalizing-bar pivoted to the wheel-frame and connected at opposite ends to the respective shovel-carrying arms.

4. In a wheeled hoe, a wheeled draft-frame, two shovel-carrying arms D, provided with rigid propelling-handles and jointed to the frame to swing horizontally to and from each other, and a bent equalizing-bar connected to the main frame by horizontal pivots and connected at its extremities by rods $f^2$ or the like to the respective arms D.

5. The wheeled hoe comprising the rigid arch A, the arms B, removably bolted thereto, the ground-wheels having their axles removably attached to said arms, and the shovel-carrying arms attached to the front ends of arms B, substantially as shown, whereby the removal of the arch and one wheel and the conversion of the machine into a one-wheel machine is permitted.

6. In a wheeled hoe, the frame carrying the ground-wheels, in combination with arms D, pivoted to the said frame in front of and in line with the wheel and provided with handles, and the shovels connected to said arms, substantially as described.

7. In a wheeled hoe, a cutter-blade to act beneath the surface, in combination with an indicator overhanging the point of the blade and sustained and carried wholly above the surface of the ground, whereby it is adapted to indicate the position of the concealed blade without liability of being itself clogged or concealed by weeds.

In testimony whereof I hereunto set my hand, this 2d day of January, 1890, in the presence of two attesting witnesses.

JAMES P. TURNER.

Witnesses:
NATHL FRENCH,
EFFIE E. MORAN.